United States Patent [19]

Moss

[11] Patent Number: 4,721,276
[45] Date of Patent: Jan. 26, 1988

[54] PIVOTING BEVERAGE DOCK

[76] Inventor: Ernest Moss, 157-16 13th Ave., Beechhurst, N.Y. 11357

[21] Appl. No.: 847,738

[22] Filed: Apr. 3, 1986

[51] Int. Cl.⁴ .............................................. A47K 1/09
[52] U.S. Cl. ................................ 248/311.2; 248/205.2
[58] Field of Search ................... 248/311.2, 309.1, 318, 248/315, 205.2, 206.5; 211/DIG. 1

[56] References Cited

U.S. PATENT DOCUMENTS

| | | | |
|---|---|---|---|
| 2,893,675 | 7/1959 | Smith et al. | 248/311.2 X |
| 2,926,879 | 3/1960 | Dietrich | 248/311.2 |
| 3,269,683 | 8/1966 | Shinaver | 248/311.2 X |
| 3,713,614 | 1/1973 | Taylor | 248/206.5 X |
| 3,842,981 | 10/1974 | Lambert | 248/311.2 X |
| 4,005,844 | 2/1977 | Richmond | 248/318 X |
| 4,191,350 | 3/1980 | Ormond | 248/311.2 X |
| 4,345,704 | 8/1982 | Boughton | 248/205.2 X |

Primary Examiner—Ramon S. Britts
Assistant Examiner—Karen J. Chotkowski
Attorney, Agent, or Firm—Edwin D. Schindler

[57] ABSTRACT

A device for holding receptacles, such as containers, cans, bottles and glasses, in an upright position. The device BEVERAGE DOCK is free swinging relative to its object support surface and the said container can be mounted onto said BEVERAGE DOCK from a horizontal plane as well as a vertical plane.

7 Claims, 9 Drawing Figures 4,721,276

PIVOTING BEVERAGE DOCK

BACKGROUND OF THE INVENTION

At present there are available on the market swiveling pivotable container receptacles which comprise one open end for insertion of said filled container and one closed end to support said container when inserted. The filled container can only be inserted in existing pivotable container receptacles from a vertical plane and the size and shape of the insertable container is limited by the diameter and length of the pivoting container receptacle.

SUMMARY OF THE INVENTION

The present invention relates to a BEVERAGE DOCK where the user has more improved means regarding receiving and positively attaching said container onto the BEVERAGE DOCK and removing said container from said BEVERAGE DOCK. The BEVERAGE DOCK may be mounted to a vertical or horizontal support surface while still providing swiveling pivotable support, in an upright position, of the said container. The present invention, BEVERAGE DOCK, may be mounted under an overhang. This recessed mounting would prevent insertion of the container in the prior art items, due to necessary vertical container insertion clearance. The BEVERAGE DOCK's container receiving and attachment feature in a horizontal plane, allows for attaching and detaching said container from said BEVERAGE DOCK when mounted under overhang. Regarding prior art designs, if the diameter of the inserable container does not closely approximate the diameter of the pivoting container receptacle, then a shift in the positioning of said container receptacle will cause the inserted container to shift off center balance, thereby tipping said container causing the contents of said inserted container to spill out. The same tipping problem of prior art items concerns inserted containers whose length exceeds an approximate supported length of said pivotable container receptacle. The open mounting face and positive attaching of said BEVERAGE DOCK allows for the use of assorted containers varying in shape, diameter and length. Varying the radius length of the BEVERAGE DOCK's support platform member and/or the platform support retainer bracket member, thereby compensating for the horizontal center of balance of said container, allows for the pivotable, upright, levelling of varying diameter containers. An object of the invention is to provide a BEVERAGE DOCK which may be simply manufactured and assembled. A second object of the invention is to provide a BEVERAGE DOCK pivotable to an upright position despite the angular inclination of the object support surface. A further object of the invention is to provide a BEVERAGE DOCK which swings freely from the object support surface and a BEVERAGE DOCK from which a container is easily attached and detached. An additional object is to allow for the mounting of containers of varying shape, diameter and length respectively onto the BEVERAGE DOCK.

IN THE DRAWINGS

FIG. 1A is an exploded perspective view of one typical configuration of the invention shown with a typical support guide for vertical or horizontal mounting onto a support surface of a support object.

DESCRIPTION OF THE PREFERRED EMBODIMENT

Figure 1:
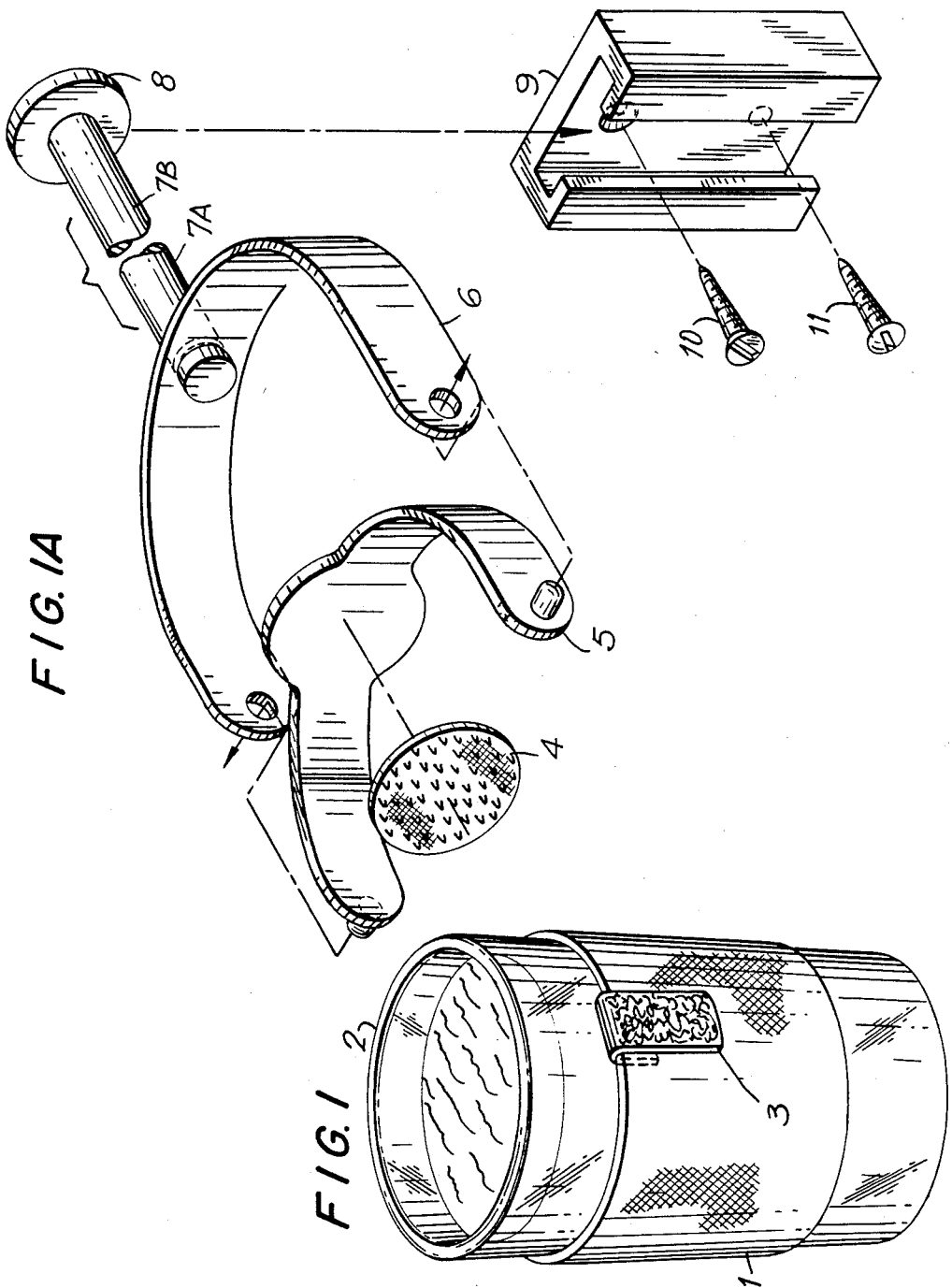
FIG. 1 is a perspective view of a filled container retained in a contour fitting container receptacle with one part of cooperable releasably holding means attached thereto.
Figure 2:
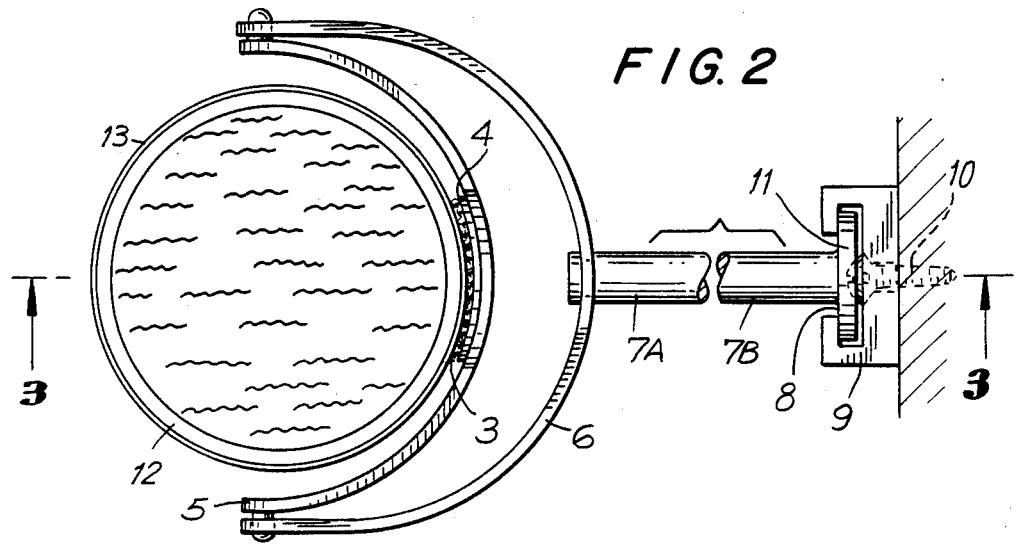
FIG. 2 is a top perspective view of the invention whereon a filled container is held in place by use of a container receptacle incorporating cooperable releasably holding means attached thereto with said invention mounted horizontally on a support surface.
Figure 3:
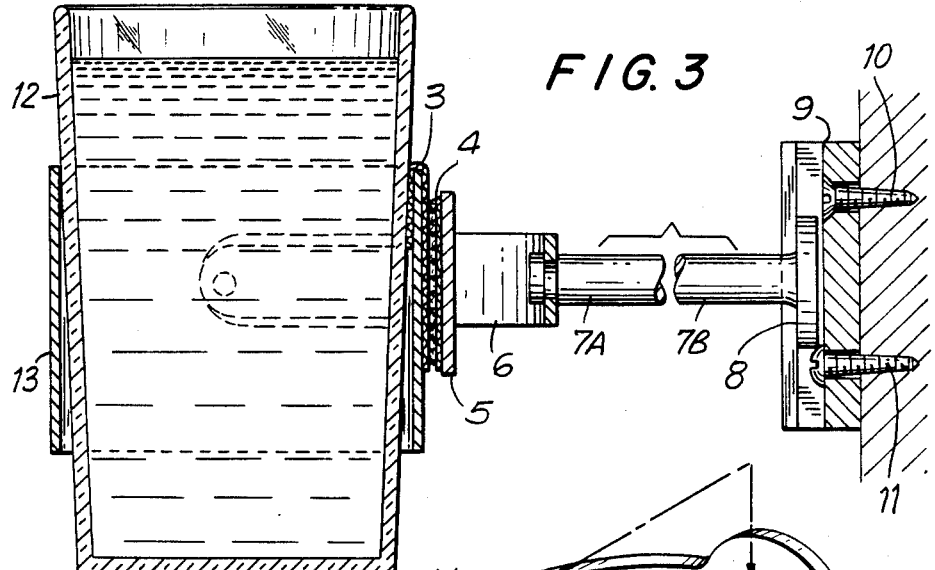
FIG. 3 is a cross sectional view of the invention whereon a filled container, tapered in shape, is held in place by use of a container receptacle incorporating cooperable releasably holding means attached thereto.

Referring now to the drawings, there is shown in FIG. 1 a parallel sided, uniform diameter container 2 filled with liquid with said container retained in an open ended contour fitting container receptacle 1 with one part of cooperable releasably holding means 3 attached thereto.

The invention is illustrated in FIG. 1A indicating horizontal plane attachment of the items in FIG. 1 to the mating part of the mutually cooperative releasable holding means 4 which is fastened onto the freeswinging support platform 5 which is held in place by the swiveling retaining bracket 6 which is supported on one end of a mounting arm 7A with the other end of the said mounting arm 7B connected to a swiveling support guide 8 for insertion into surface support guide 9 for vertical or horizontal mounting to a support surface using screws 10 and 11 for mounting said surface support guide 9 and typically holding said swiveling support guide 8 in place.

A sleeve type rigid container receptacle 13 which is open at both ends to accept and hold a tapered container 12, and in fact said container receptacle 13 may be a sleeve open at both ends with a vertical separation opening with spring type retention arms into which the filled container 12 may be inserted by pushing said container therein until seated in the container receptacle 13. Then the container receptacle 13 with one part of cooperable releasable mating means on at least one surface 3 is releasably mated with the invention's cooperable mating means 4 which is attached onto the support platform 5.

Figure 4:
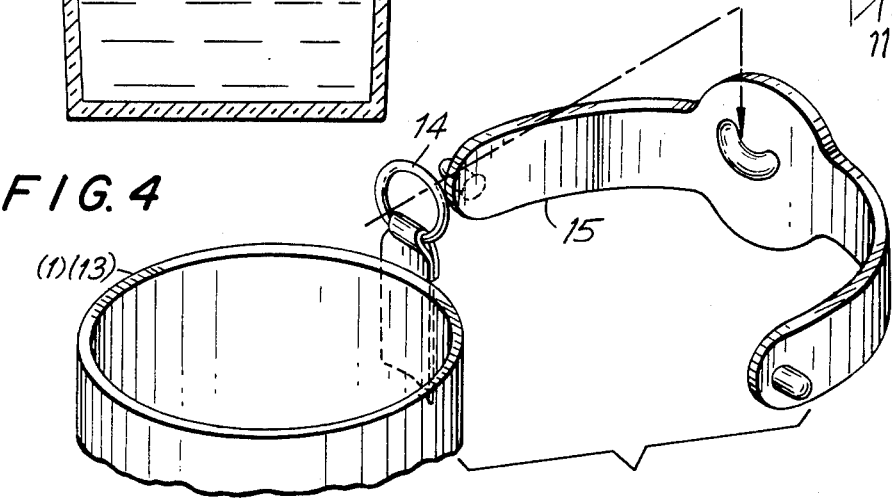
FIG. 4 is a perspective view of the support platform of the invention with a hook made part thereof for receiving a loop ring attached onto the container receptacle as the cooperable releasable holding means for attaching said container onto said invention.
Figure 5:
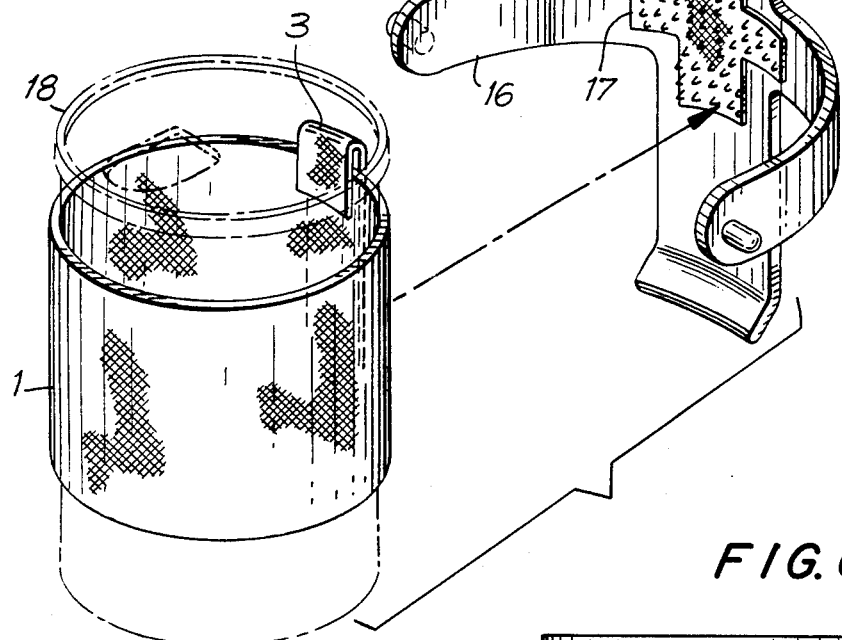
FIG. 5 is a perspective view of the invention showing another typical configuration of the invention's support platform and another typical configuration of cooperable releasably holding means attached thereto to releasably receive a container receptacle with a beverage can inserted and retained therein.
Figure 6:
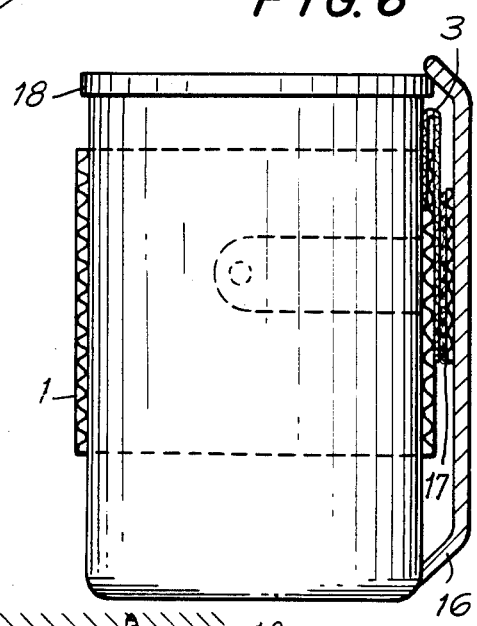
FIG. 6 is a cross sectional view of the invention's support platform arm being utilized as a support in addition to a vertical and horizontal alignment guide for attaching said container receptacle with a beverage can inserted therein onto said support platform and also showing positive support of said platform support against said beverage container.
Figure 7:
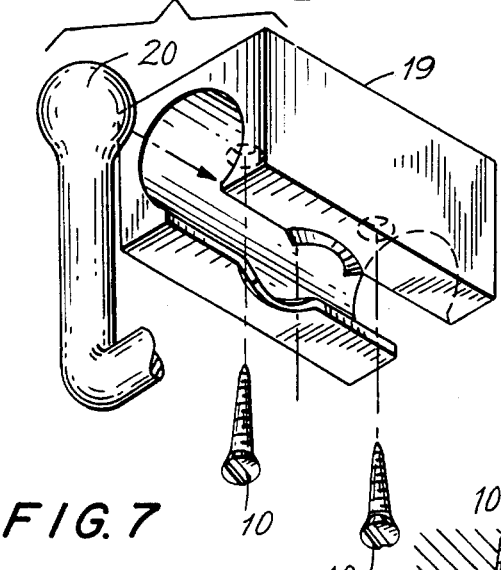
FIG. 7 is a perspective view of a typical support guide for mounting the invention in a vertical position utilizing a rounded mounting arm for insertion into a typical rounded pivoting ball-joint axis support guide.
Figure 8:
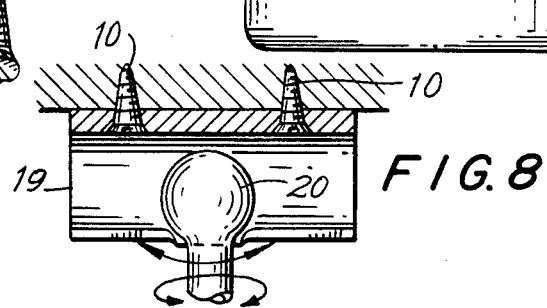
FIG. 8 is a cross sectional view of the rounded mounting arm inserted into a rounded pivoting ball-joint axis support guide and held in place in a vertical plane position.

FIG. 4 illustrates a ring loop 14 which is attached to the container receptacle typically 1 or 13 which may then be cooperably releasably attached onto a support platform 15 which utilizes a hook as the matingly cooperable releasable holding means for attaching said container receptacle 1 or 13 onto said invention.

A beverage can container 118 is shown retained in a container receptacle 1 with one part of cooperable releasable holding means 3 attached thereto for releasably mounting said container receptacle 1 onto a typical support platform 16 with a typical configuration of one part of cooperable releasable mating means 17 attached thereto.

The inherent vertical and horizontal alignment design features of support platform 16 are for receiving and attaching said container receptacle 1 with its inserted beverage can 18 therein onto the support platform's 16 cooperable releasable mating means 17 of the invention.

In the exemplary form of the invention shown in the drawings the cooperable releasable holding fastener means used to attach the container receptacle onto the BEVERAGE DOCK is typically shown as either one part of hook and loop pile material 3 or a circular loop 14. Especially for ship-board use non-magnetic and/or non-metallic cooperable mating means are preferable, although in other applications metallic and/or magnetic may be suitable.

The means for retaining the support platform 5 on the support platform bracket 6 is typically illustratively indicated herein by pins on the support platform 5 inserted into the mounting holes on support platform bracket 6 however, other types of rotatable pinions may be satisfactory.

The means for retaining the support platform bracket 6 on the mounting arm end 7A is illustratively indicated herein by one-piece non-rotating construction whereas another typical construction may be a rotating movable two-piece captive connection.

When a vertical orientation mounting is desired for the BEVERAGE DOCK the mounting arm end 7B may be formed into a typical ball type support 20 which will allow a typical pivotal orientation when inserted and retained into the ball-joint recess of the mounting support guide 19 which is then mounted onto a support surface using screws 10.

A less preferred construction of the support platform 16 might be the incorporation of a right angle step at the bottom on which the bottom of the container might rest. This would however, defeat the unrestricted length containment feature of the invention.

While certain novel features of this invention have been shown and described and are pointed out in the annexed claims, it will be understood that various omissions, substitutions and changes in the forms and details of the device illustrated and its operation can be made by those skilled in the art without departing from the spirit of the invention.

Accordingly, it is desired that the foregoing description be read as being merely illustrative of an operative embodiment of this invention and not in a limiting sense.

The inventor claims as follows:

1. A BEVERAGE DOCK, comprising: means for mounting; a retaining bracket in communication with said means for mounting; and, a free-swinging, open-faced support platform having first cooperable releasable mating means, a receptacle having a second cooperable releasable mating means cooperating with the first cooperable releasable mating means, said support platform connected to said retaining bracket by means permitting relative movement between the support platform and the retaining bracket wherein said support platform is capable of movement relative to said retaining bracket, said support platform being capable of holding a container or a container receptacle of conforming or non-conforming configurations and lengths and being capable of replacement by one or more containers or container receptacles of varying widths.

2. The BEVERAGE DOCK of claim 1, wherein said means for mounting said BEVERAGE DOCK comprises thick cooperable release mating means.

3. The BEVERAGE DOCK of claim 1, wherein said means for mounting said BEVERAGE DOCK comprises fixed holding means.

4. The BEVERAGE DOCK of claim 1, wherein said mounting means mounts over a support object.

5. The BEVERAGE DOCK of claim 1, wherein said mounting means mounts onto a support object.

6. The BEVERAGE DOCK of claim 1, wherein said means for mounting is dimensionally flexible or adjustable.

7. The BEVERAGE DOCK of claim 1, wherein said retaining bracket and said support platform are made of a flexible material.

* * * * *
* * * * *